United States Patent [19]

Isaacs

[11] Patent Number: 4,742,595

[45] Date of Patent: May 10, 1988

[54] WINDOW CLEANING DEVICE

[76] Inventor: John E. Isaacs, P.O. Box 1126, Pontre Vedra Beach, Fla. 32082

[21] Appl. No.: 44,318

[22] Filed: Apr. 30, 1987

[51] Int. Cl.[4] .............................................. B60S 1/04
[52] U.S. Cl. ........................................ 15/105; 16/326; 16/112; 16/115; 403/95; 403/96; 15/121; 15/144 R; 15/144 B; 15/245
[58] Field of Search ................ 15/105, 111, 114, 117, 15/118, 121, 144 R, 144 B; 16/115, 112, 324, 349, 326, 114 R; 403/93, 95, 96, 92

[56] References Cited

U.S. PATENT DOCUMENTS

| | | | |
|---|---|---|---|
| 1,579,941 | 4/1926 | Jenkins | 15/145 |
| 2,938,223 | 5/1960 | Horowitz | 15/145 X |
| 3,205,520 | 9/1965 | Trentel | 15/144 R X |
| 3,540,071 | 11/1970 | Jorgensen | 15/105 |
| 3,968,535 | 7/1976 | Nichols | 15/105 |

Primary Examiner—Harvey C. Hornsby
Assistant Examiner—K. L. O'Leary
Attorney, Agent, or Firm—Lloyd F. Seebach

[57] ABSTRACT

The invention relates to a window cleaning device in which a cleaning member having a squeegee and scraper arranged along opposite longitudinal edges thereof is in the form of a U-shaped channel in which the handle and a retainer for the handle are pivotally arranged and compactly positioned, when not in use, for storage in a glove compartment or map pocket of an automobile.

7 Claims, 1 Drawing Sheet

U.S. Patent    May 10, 1988    4,742,595
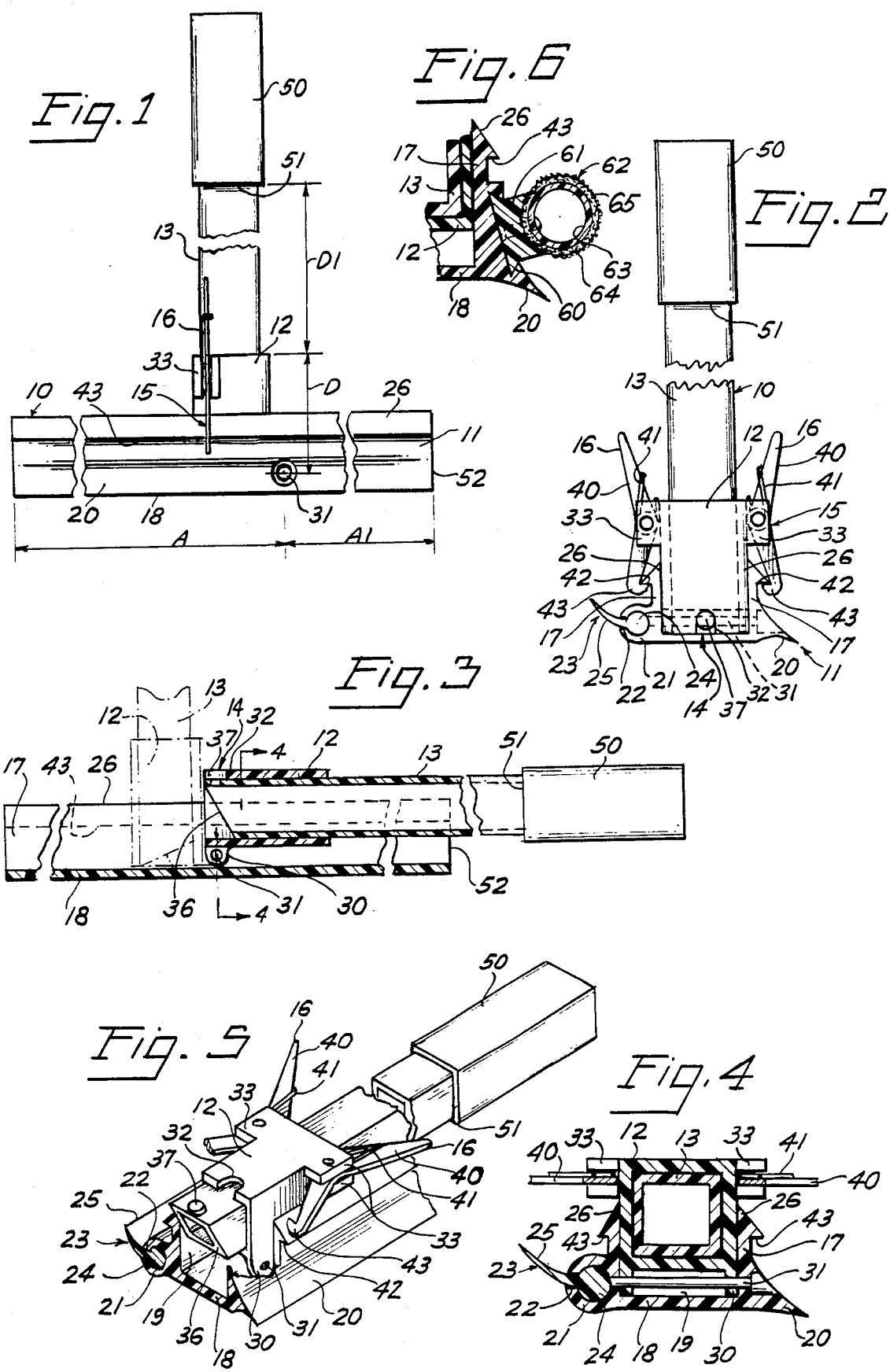

WINDOW CLEANING DEVICE

FIELD OF THE INVENTION

The present invention relates to a window cleaner and squeegee and more particularly to a window cleaner of the type used for cleaning, scraping and removing snow from the windshield of an automobile.

DESCRIPTION OF THE ART

The prior art discloses a number of devices by which a handle used in conjunction with a window cleaner or a squeegee is pivotally mounted centrally of the squeegee portion and movable into a position over or into alignment therewith. In this case, the handle is usually about half the length of the squeegee portion and can be no longer because of the pivotal mounting of the handle. In other devices, the handle portion telescopes into a brush or squeegee portion to provide for an extension of the brush or squeegee portion for use as a longer handle. With such devices the handle is of limited length and hampers use of the device across a large part of the windshield, for example, requiring the user to lean way over the hood of the automobile to reach the center of the windshield.

SUMMARY OF THE INVENTION

The object of the invention is to provide a window cleaning device comprising a cleaner and squeegee which can be readily compacted into a unit easily storable in the glove compartment or map pocket of an automobile.

Another object of the invention is to provide a window cleaner and squeegee in which the handle thereof can be contained within the cleaner and squeegee portion to provide a compact, storageable unit.

Still another object of the invention is to provide a window cleaner and squeegee in which the length of the handle can be at least as long as the cleaner-squeegee portion.

Yet another object of the invention is to provide a window cleaner and squeegee that can be formed or transposed into a compact, storageable unit and that is durable and efficient in use.

These and other objects, as well as advantages, of the invention will be apparent to those skilled in the art by the description which follows and which is made in conjunction with the accompanying drawing.

Briefly, the objects of the invention are attained by a window cleaning device comprising a member having a U-shaped cross section in which a hollow retainer is pivotally mounted with a handle that is slidably arranged in the retainer in a telesoping relation. The U-shaped member carries a squeegee along one edge thereof and a scraper along the other longitudinal edge. The retainer is movable between a first position in which it lies within the U-shaped channel member and a second position in which the retainer is without the channel and substantially normal to the longitudinal length of the U-shaped member. The handle is movable within the retainer and also lies within the U-shaped channel member when the retainer is in the first position. As the handle is moved to an extended position, a pin on one end of the handle engages a slot in the retainer so the retainer and the handle are then coupled together. The coupling of the retainer and the handle can occur only when the retainer is in the first position, that is, within the U-shaped channel member. Once the coupling has been accomplished, the retainer can be moved into the second position together with and by the handle, thereby positioning the handle substantially central of the longitudnal length of the U-shaped channel member. When the retainer and the handle are in the second position, releasable latching members on the retainer engage the U-shaped member to maintain the retainer and the handle in the second position to utilize with window cleaning device for its intended purpose.

In order to store the cleaning device, the latching members are first released, thereby permitting the handle to move the retainer into its first position within the U-shaped member, the handle then being in its extended position and still coupled to the retainer. As the handle is moved toward the retainer, the pin on the handle is disengaged from the slot in the retainer, thereby decoupling the handle from the retainer and permitting the handle to be moved through the retainer and within the U-shaped member. When the handle is fully within the U-shaped member, the overall storage size of the window cleaning device is determined primarily by the overall length of the U-shaped member and its cross sectional dimensions. This size is such that storage in a glove compartment or map pocket can be readily accomplished.

DESCRIPTION OF THE DRAWING

Reference is now made to the accompanying drawing wherein like reference numerals and characters designate like parts:

FIG. 1 is a plan view of a window cleaning device in accordance with the invention and showing the various elements in their respective positions for the intended use of the device;

FIG. 2 is a left end view of the window cleaning device shown in FIG. 1 and showing the arrangement of the latching means relative to the other elements or parts of the device;

FIG. 3 is a longitudinal section through the window cleaning device shown in FIG. 1 and showing the retainer in its first position within the U-shaped member and the handle in its extended position and coupled to the retainer prior to movement of the handle through the retainer for storage or for moving the retainer into its second position;

FIG. 4 is a vertical section taken substantially along line 4—4 in FIG. 3 and showing the relation of the handle and retainer to the U-shaped member;

FIG. 5 is a perspective view showing the U-shaped member, retainer and handle in a position in which the engaging means has been decoupled; and FIG. 6 is a partial sectional view showing a cleaning member that can be utilized in conjunction with a squeegee and slidably inserted into the U-shaped member over and above the scraper.

DESCRIPTION OF PREFERRED EMBODIMENTS

With particular reference to FIG. 1, the window cleaning device, generally designated by the numeral 10, comprises a cleaning member 11, a hollow retainer 12, a handle 13, engaging means 14, see FIG. 2 latching means 15, the latter including part of the cleaning member 11 and releasably engaging members 16 pivotally mounted on the retainer 12, as more fully described hereinafter.

The cleaning member 11 by means of spaced and vertically extending legs 17 and an interconnecting base portion 18 forms a longitudinally extending U-shaped channel 19, see FIGS. 2 and 5. At the juncture of one of the legs 17 and the base portion 18, a scraper 20 is formed which extends the length of the cleaning member 11. At the juncture of the other leg 17 and the base portion 18 a bulbous portion 21 is formed longitudinally of the cleaning member 11 and is provided with a longitudinal slot 22, see FIGS. 2 and 4. A squeegee 23 has a cross section, as shown in FIG. 4, and comprises a longitudinal cylindrical portion 24 and a blade 25. The portion 24 is complimentary in cross section to the bore in the bulbous portion 21 so as to allow the squeegee to be inserted therein from either end of the cleaning member 11 with the blade 25 extending through the slot 22, as seen in FIG. 4. The free ends 26 of the legs 17 are formed, as shown in FIG. 4, to cooperate with the latching means 15, as described more fully hereinafter. The cleaning member 11 is preferably made of a relatively hard plastic material that can be easily extruded to provide a single member as disclosed and as one skilled in the art will appreciate.

The retainer 12 can also be made of a plastic material and has a cross section, as seen in FIGS. 4 and 5, that is hollow and complimentary in shape to the U-shaped channel 19 formed by legs 17 and base portion 18. At one end, the retainer 12 is provided with spaced ears 30 on each side thereof by which the retainer 12 is pivotally mounted within the U-shaped channel 19 by means of a pintle 31 having its ends journalled in the cleaning member 11, as seen in FIG. 4. The actual location of the pin 31 is off-set relative to the center of the retainer 12 so that in a first position, as seen in FIGS. 3 and 5, the retainer 12 lies within the U-shaped channel 19 and in a second position, as seen in FIGS. 1 and 2, is normal to the cleaning member 11 with its axis or center line generally central and normal or perpendicular to the length of the cleaning member 11. For this reason, as shown in FIG. 1, the length A will be greater than the length A1. The retainer 12 is also provided with an open-end slot 32 at the end adjacent ears 30 and with a pair of extending, spaced lugs 33 on each side thereof and at the end thereof opposite the slot 32.

The handle 13 corresponds in cross section to the hollow configuration of the retainer 12, see FIG. 4, and slidably engages the retainer 12 in telescoping relation. The end 36 of the handle 13 is cut at an angle to provide clearance for a reason about to be described and carries a headed member or pin 37 that is fixed thereto and arranged to engage the open-end slot 32. Thus, the slot 32 and pin 37, when in engaging relation as seen in FIG. 3, provide means for coupling the retainer 12 and the handle 13.

The releasable latching means 15 comprises a lever 40 pivotally mounted between each pair of spaced lugs 33 and each of which is biased by a spring 41 in a direction toward the retainer 12. The nose 42 of each lever 40 engages the shoulder 43 on the end of its respective leg 17. While the shoulder 43 is shown as extending the length of the cleaning member 11, this arises from fact that as an extrusion the shoulder is of necessity a continuous one even though it is only used in the immediate vicinity of the levers 40.

The operation of the window cleaning device 10 will be best understood from the description which follows. The cleaning member 11 can be of any length but for purposes of convenient storage in the glove compartment or map pocket of an automobile, a length of about 6 to 8 inches is appropriate. The handle 13 can be longer to include an additional portion or grip 50 to utilize the device 10 to advantage.

The retainer 12, when the device 10 is stored, lies within the U-shaped channel 19, see FIG. 3, and in this first position of the retainer, the handle 13 is also within channel 19 and fully moved to the left with the pin 37 disengaged from the slot 32. In this position the face 51 of the grip 50 can engage the end 52 of the cleaning member 11 to limit the movement of the handle 13 to the left and through the retainer 12 when these parts are within the channel 19.

It can be readily appreciated that the handle 13 cannot be moved out of its position within the channel 19 until it has been fully extended by movement to the right and pin 37 has been moved into engagement with the slot 32. When in this extended position, the retainer 12 and handle 13 are coupled so as to be movable from the first position in a counterclockwise direction to position the retainer 12 and handle 13 in a second position normal to the cleaning member 11. In this normal position, the effective length of the handle 13 is the length D measured from the pin 31 to the end 52 plus the length D1 of the handle 13 between end 52 and the grip 50 facing the retainer 12. If the pin 37 is not within the slot 32, the second position cannot be fully attained even with the angular end 36 provided on handle 13 because the handle will first engage the base portion 18, thereby limiting the movement of the handle 13 and the retainer 12 in the counterclockwise direction.

With reference to FIG. 6, one of the legs 17 can be provided with a longituinally extending track 60 in which a holder 61 is slidably retained and carries a scrubbing member 62 that comprises a cylindrical support 63 around which a water absorbent material 64 is wrapped and covered with a nylon netting material 65. This embodiment permits, for example, the windshield of a car to be washed and scrubbed so as to soften the road dirt and/or bugs which can then be removed by the scraper 20. After this step, water can again be applied to the windshield and then removed by the scraper 20 or the squeegee 23.

As set forth hereinabove , the various parts or elements comprising the device 10, particularly the cleaning member 11, the retainer 12 and the handle 13 can be extruded from a suitable plastic material. The other parts are of simple design and, as a whole, the device 10 can be easily manufactured and readily assembled. Further, the size and shape of the parts can be changed or altered without affecting the operation, function and/or purpose of such parts.

Accordingly, the invention has been described in detail with particular reference to preferred embodiments thereof, but it will be understood that variations and modifications can be effected within the spirit of the invention.

I claim:

1. A window cleaning device comprising in combination:
    a cleaning member having spaced, vertically extending legs and an interconnecting base for forming an elongated U-shaped channel, the junction of one leg and the base forming a longitudinally extending scraper portion and the junction of the other leg and the base forming a longitudinally extending open-end slot for receiving a complimentary shaped and slidably insertable squeegee member;

a hollow retainer pivotally mounted on the cleaning member for movement between a first position substantially within the channel and a second position extending without and generally normal to the channel;

a handle lying within the channel and slidably mounted in telescoping relation with the retainer when the latter is in the first position and into an extended position for movement as a unit with the retainer;

means on one end of the handle for engaging the retainer when the latter is in the channel and in the first position and the handle is in the extended position, the handle and the retainer then being movable as a unit into the second position of the retainer; and latching means pivotally mounted on the retainer for releasably engaging at least one of the legs of the cleaning member for maintaining the retainer and the handle in the second position to utilize the cleaning member.

2. A window cleaning device in accordance with claim 1 wherein at least a part of one of the legs of the cleaning member is provided with means for cooperating with the latching means for maintaining the retainer and the handle in the second position.

3. A window cleaning device in accordance with claim 1 wherein the handle, when lying within the channel, can be moved only into the extending position for engaging the retainer.

4. A window cleaning device in accordance with claim 1 wherein the pivotal mounting of the retainer is displaced relative to the longitudinal center of the cleaning member so as to position the retainer and the handle substantially central of the cleaning member when in the second position.

5. A window cleaning device in accordance with claim 1 wherein the hollow retainer is provided at one end with an open-end slot and the engaging means on the handle is movable into the slot as the handle is moved into the extended position.

6. A window cleaning device in accordance with claim 5 wherein the engaging means comprises a pin on the one end of the handle.

7. A window cleaning device in accordance with claim 1 wherein the scraper portion includes a longitudinal track arranged adjacent thereto for receiving a slidably insertable scrubbing member.

* * * * *